(12) United States Patent
Smith et al.

(10) Patent No.: US 10,046,695 B2
(45) Date of Patent: Aug. 14, 2018

(54) VEHICLE VISIBILITY SYSTEM

(71) Applicants: Judson Smith, Gilbert, AZ (US); Karla Flores, Gilbert, AZ (US)

(72) Inventors: Judson Smith, Gilbert, AZ (US); Karla Flores, Gilbert, AZ (US)

( * ) Notice: Subject to any disclaimer, the term of this patent is extended or adjusted under 35 U.S.C. 154(b) by 155 days.

(21) Appl. No.: 14/916,941

(22) PCT Filed: Sep. 6, 2014

(86) PCT No.: PCT/US2014/054441
§ 371 (c)(1),
(2) Date: Mar. 4, 2016

(87) PCT Pub. No.: WO2015/035272
PCT Pub. Date: Mar. 12, 2015

(65) Prior Publication Data
US 2016/0193958 A1      Jul. 7, 2016

Related U.S. Application Data

(60) Provisional application No. 61/874,470, filed on Sep. 6, 2013.

(51) Int. Cl.
*B60Q 1/28* (2006.01)
*B60Q 1/46* (2006.01)
(Continued)

(52) U.S. Cl.
CPC .............. *B60Q 1/28* (2013.01); *B60Q 1/0076* (2013.01); *B60Q 1/0094* (2013.01);
(Continued)

(58) Field of Classification Search
CPC ....... B60C 1/28; B60C 1/0076; B60C 1/0094; B60C 1/2696; B60C 1/30; B60C 1/44
(Continued)

(56) References Cited

U.S. PATENT DOCUMENTS

| | | |
|---|---|---|
| 4,819,135 A | 4/1989 | Padilla et al. |
| 4,857,890 A | 8/1989 | Solow |

(Continued)

FOREIGN PATENT DOCUMENTS

| | | |
|---|---|---|
| EP | 2230162 | 9/2010 |
| GB | 2320322 | 6/1998 |
| WO | WO2014008201 | 1/2014 |

OTHER PUBLICATIONS

"3D Printing Aids motorcycle Safety," Leslie Langnau, Make Parts Fast, available at http://www.makepartsfast.com/2013/06/5556/3d-printing-aids-motorcycle-safety/, Jun. 11, 2013.
(Continued)

*Primary Examiner* — Laura Tso
(74) *Attorney, Agent, or Firm* — IPTechLaw (57) ABSTRACT

A vehicle visibility system. Implementations include a first front facing light element coupled to a vehicle on a first side of a center line of a vehicle and a second front facing light element coupled on a second side of the center line. The system includes a switch electrically coupled with the first and second front facing light elements and with an electrical power system. The first and second front facing light elements each include a controller and each are configured to alternately flash using the controller in response to receiving an electrical signal from the switch when the switch is in an activated position. When the first and second front facing light elements are alternately flashing, the visibility of the vehicle to oncoming traffic may be increased. The first and second front facing light elements are not coupled to a handlebar or caliper region of the vehicle.

10 Claims, 9 Drawing Sheets

(51) Int. Cl.

| | | |
|---|---|---|
| *G08B 5/38* | (2006.01) | |
| *B62J 6/00* | (2006.01) | |
| *B62J 27/00* | (2006.01) | |
| *B60Q 1/30* | (2006.01) | |
| *B60Q 1/44* | (2006.01) | |
| *B60Q 1/00* | (2006.01) | |
| *B60Q 1/26* | (2006.01) | |
| *B62J 6/16* | (2006.01) | |
| *B60Q 1/56* | (2006.01) | |

(52) U.S. Cl.
CPC .............. *B60Q 1/2696* (2013.01); *B60Q 1/30* (2013.01); *B60Q 1/44* (2013.01); *B60Q 1/46* (2013.01); *B62J 6/001* (2013.01); *B62J 6/16* (2013.01); *B62J 27/00* (2013.01); *G08B 5/38* (2013.01); *B60Q 1/56* (2013.01); *B60Q 2900/10* (2013.01)

(58) Field of Classification Search
USPC .......................... 362/473, 474, 459, 540, 497
See application file for complete search history.

(56) References Cited

U.S. PATENT DOCUMENTS

| | | | |
|---|---|---|---|
| 5,313,188 A | | 5/1994 | Choi et al. |
| 5,856,779 A | | 1/1999 | Friday |
| 5,933,076 A | * | 8/1999 | Babb ................. B62J 6/005 200/61.27 |
| 6,025,775 A | | 2/2000 | Erlandson |
| 6,081,190 A | | 6/2000 | Kellermann |
| 6,799,877 B2 | | 10/2004 | Watkins et al. |
| 6,805,473 B2 | | 10/2004 | Beard |
| 7,466,222 B2 | | 12/2008 | Scott |
| 7,585,095 B1 | * | 9/2009 | Sheriff .................. B60Q 1/503 362/367 |
| 7,997,775 B2 | | 8/2011 | Hurwitz |
| 8,650,781 B1 | * | 2/2014 | Ehrman ................ B60Q 1/56 362/473 |
| 2002/0093820 A1 | | 7/2002 | Pederson |
| 2003/0133308 A1 | * | 7/2003 | Christensen ............ B62J 6/005 362/523 |
| 2003/0179087 A1 | | 9/2003 | Stahel |
| 2004/0075543 A1 | | 4/2004 | Miyamoto |
| 2008/0179486 A1 | | 7/2008 | Russell et al. |
| 2008/0285292 A1 | * | 11/2008 | Medina ................ B60Q 1/2607 362/473 |
| 2010/0053983 A1 | * | 3/2010 | Liu ........................... B62J 6/00 362/474 |
| 2010/0067245 A1 | * | 3/2010 | Fan ........................... B62J 6/00 362/474 |
| 2010/0195339 A1 | * | 8/2010 | May .................... B60Q 1/0483 362/473 |
| 2011/0169409 A1 | | 7/2011 | Stasky et al. |
| 2011/0239495 A1 | | 10/2011 | Puccio |
| 2013/0033883 A1 | | 2/2013 | Ward et al. |
| 2013/0057398 A1 | | 3/2013 | Wen |

OTHER PUBLICATIONS

"LED Motorcycle Brake Lights Review," Rick K., webBikeWorld. com, available at http://www.webbikeworld.com/Motorcycle-technical-articles/Brake-lights.htm, 2000.

"Skene P3 Lights," Motorcycle Innovations.ca, available at http://www.motorcycleinnovations.ca/Skene_P3_Lights_p/p3.htm, 2011.

"International Search Report" for International Application No. PCT/US14/054441, dated Jan. 8, 2015.

* cited by examiner

VEHICLE VISIBILITY SYSTEM

CROSS REFERENCE TO RELATED APPLICATIONS

This document claims the benefit of the filing date of U.S. Provisional Patent Application 61/874,470, entitled "Vehicle Visibility System" to Smith et. al., which was filed on Sep. 6, 2013, (the '470 provisional) the disclosure of which is hereby incorporated entirely herein by reference.

BACKGROUND

1. Technical Field

Aspects of this document relate generally to systems for increasing the visibility of a vehicle to drivers of other vehicles. Particular implementations of vehicle visibility systems relate to increasing the visibility of a motorcycle to drivers of other vehicles.

2. Background Art

Conventional vehicle lighting systems include headlamps, tail lights, and, in particular systems, turning signal (flasher) lights. These devices are used to illuminate the direction of travel, provide visual notification of the presence of the vehicle, and inform other drivers of the intent to turn to the right or left.

SUMMARY

Implementations of vehicle visibility systems may include: at least a first light element coupled to a first bar or first fairing of a vehicle and located on a first side of the vehicle and at least a second light element coupled to a second bar or a second fairing of a vehicle and located on a second side of the vehicle. The first side may be on one side of a midpoint of a front of the vehicle and the second side may be located on another side of the midpoint of a front of the vehicle. A manually activated switch may be included which is coupled to one of a handlebar and a switch panel of the vehicle where the manually activated switch is operatively coupled to the at least first light element and to the at least second light element. The manually activated switch may be operatively coupled to an electrical power source included in the vehicle. The at least first light element and the at least second light element may each include a controller. The at least first light element and the at least second light element may be oriented to face the front of the vehicle (front facing). The controller of the at least first light element and the controller of the at least second light element are configured to flash (illuminate, emit light) at alternate times and/or alternate patterns of flashes in response to receiving electrical power from the electrical power source when the manually activated switch is in the on position, thereby increasing the visibility of the vehicle to oncoming traffic viewing the front of the vehicle.

Implementations of vehicle visibility systems may include one, all, or any of the following:

The system may include a motorcycle rear visibility lighting system which includes a bracket configured to couple with a motorcycle license plate where the bracket contains one or more plate mounting openings therein (therethrough), one or more light element openings, and an angle adjustment opening therein. The angle adjustment opening may be configured to permit the adjustment of the angle of a light element coupled to the bracket.

The motorcycle rear visibility light system may further include a light element coupled to the bracket where the light element is coupled to a controller and is configured, in response to receiving a brake signal from the motorcycle, to flash at high intensity for a predetermined period of time.

The predetermined period of time may be less than about 2 seconds.

The at least first light element and the at least second light element may include one or more light emitting diodes (LEDs) and the LEDs may be brighter than a brightness of a headlamp of the vehicle.

Implementations of a vehicle visibility system may include a first front facing light element configured to couple to a vehicle on a first side of a center line of a vehicle. The system may also include a second front facing light element configured to couple to a vehicle on a second side of the center line of the vehicle. The system may also include a switch configured to electrically couple with the first front facing light element and with the second front facing light element and with an electrical power system of the vehicle. The first front facing light element and the second front facing light element may each include a controller where each are configured to alternately flash through (using) the controller in response to receiving an electrical signal from the switch when the switch is in an activated position. When the first front facing light element and the second front facing light element are alternately flashing, the visibility of the vehicle to oncoming traffic may be increased. The first front facing light element and the second front facing light element are not configured to couple to a handlebar or caliper region of the vehicle.

Implementations of vehicle visibility systems may include one, all, or any of the following:

The first front facing light element and the second front facing light element may be configured to couple only to a portion of the vehicle that is fixed when the vehicle is steered.

The first front facing light element and the second front facing light element may include one or more light emitting diodes (LEDs) and the LEDs may be brighter than a brightness of a headlamp of the vehicle.

The system may further include a motorcycle rear visibility lighting system that includes a bracket configured to couple with a motorcycle license plate where the bracket contains one or more plate mounting openings therein, one or more light element openings, and an angle adjustment opening therein configured to permit the adjustment of the angle of a light element coupled to the bracket.

The motorcycle rear visibility lighting system may include a light element coupled to the bracket where the light element is coupled to a controller and is configured to, in response to receiving a brake signal from the motorcycle, flash at high intensity for a predetermined period of time.

The predetermined period of time may be less than about 2 seconds.

Implementations of a vehicle visibility system kit may include a first front facing light element including a controller; a second front facing light element including a controller; a switch; a first mount or a first shim; and a second mount or a second shim.

Implementations of a vehicle visibility system kit may include one, all, or any of the following:

A first wire and a second wire; a first switch wire; a second switch wire; a fuse; and a power wire.

A license plate bracket containing one or more plate mounting openings therein, one or more light element openings, and an angle adjustment opening therein; a rear light element; and a rear light element controller.

A rear power wire and a rear brake signal wire.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended vehicle visibility systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such vehicle visibility systems, and implementing components and methods, consistent with the intended operation and methods.

Figure 1:
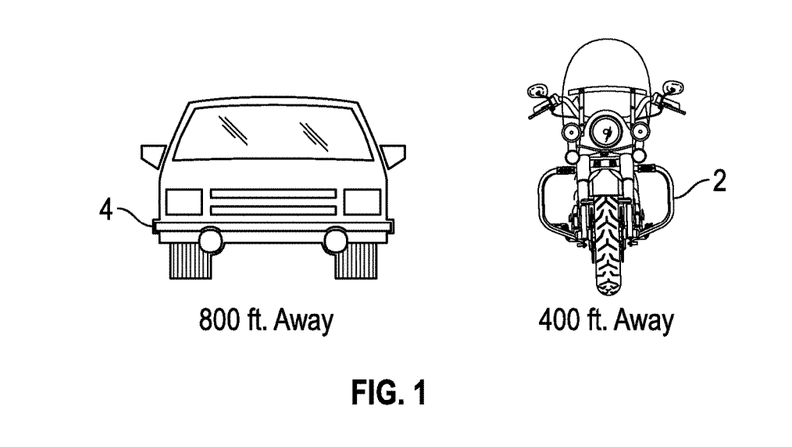
FIG. 1 is a diagram showing the comparative size of an automobile and a motorcycle at two different distances from the viewer.

Drivers of motorcycles and other vehicles (such as scooters, wheelchairs, motorized wheelchairs, golf carts, motorized shopping carts, all-terrain vehicles (ATVs), quads, quad bikes, three-wheelers, dune buggies, tomcars, smart cars, microcars, and the like), that are smaller, in general, than automobiles, sometimes have an increased risk of accidents due to other drivers having difficulty seeing them. According to a 1981 government-sponsored Hurt Report, about two-thirds of multiple-vehicle accidents involving a motorcycle were caused by the non-motorcycle driver violating the right of way of the motorcycle driver. In some instances this may be at least partially caused by drivers of other vehicles mistaking the distance of the smaller vehicle due to its smaller size, or diminished visibility for several reasons, including a lack of sufficient lighting. For example, referring to FIG. 1, a motorcycle 2 that is about 400 feet away looks close to the size, at least height-wise, of an automobile 4 that is about 800 feet away. Thus, there is an approach differential factor (ADF) that causes the driver of another vehicle to mistake the motorcycle 2 as being about 800 feet away and to think that they will not be violating the right of way of the motorcycle driver by driving in front of the motorcycle when, due to the actual closeness of the motorcycle, they will be violating the motorcycle driver's right of way, thus creating an unsafe and hazardous condition for the approaching motorcycle.

There may be other causes and factors making it more difficult for drivers to see vehicles that are generally smaller than automobiles. For example window partitions and other obstructions, in or outside of a driver's vehicle, may create full or partial blind spots that fully or partially cover up or hide a smaller vehicle. Whatever the cause, the driver of the smaller vehicle may increase his safety by having a mechanism and/or method to help the other drivers see him and his vehicle.

Figure 2:
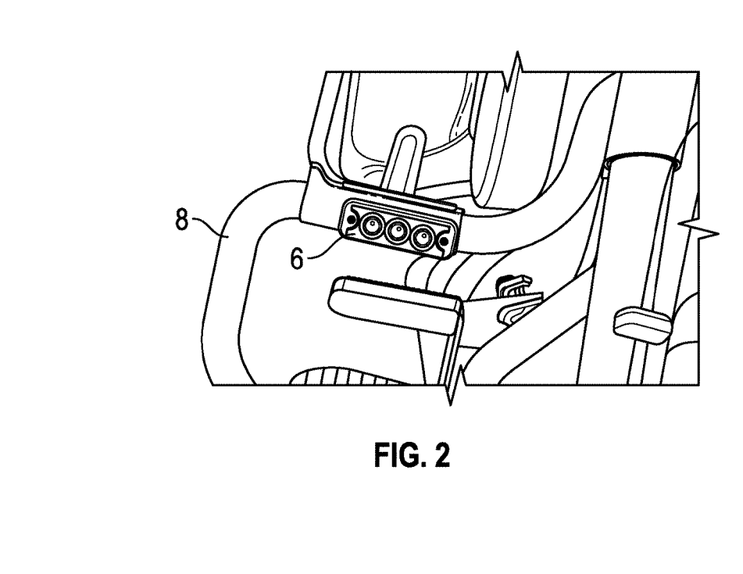
FIG. 2 is a perspective view of an implementation of an light element installed on a highway/crash bar.

Referring to FIG. 2, a vehicle visibility system includes a light element 6. The light element 6 may include any number of lights of any variety and of particular color and various brightnesses, voltages, wattages, and the like. In implementations, the lights of the light element 6 could emit, for instance, a white, yellow, amber, or orange. Due to legal restrictions, the light element 6 is not permitted to emit red or blue lights for non-law enforcement vehicles; however, when used for law enforcement vehicles, the light element 6 could emit such colors. The light element 6 can also include multiple colored lights, for example, in implementations, the light element 6 could include one white light, one yellow light, one amber light, and so forth. In most implementations, however, the light element 6 may have multiple lights and all of the lights may be of the same color. In implementations, the light element 6 may be designed so that, when the light element 6 receives electrical power, all of the lights come and stay on in steady fashion, or all of the lights blink simultaneously, or the lights blink in non-simultaneous fashion (such as a "chasing lights" configuration), or the like. This function is controlled by use of a controller included in the light element 6 that is programmed to execute a particular light pattern upon receiving electrical power.

In implementations the lights of the light element 6 include light emitting diodes (LEDs) though, in other implementations, the lights could include halogen lamps (such as tungsten-halogen lamps) or any other type of light. In implementations the light element 6 may include a mini LED, such as an RECT-13LS mini LED warning light or an RECT-14LS dual channel mini LED warning light available from Tomar Electronics, Inc., of 2100 W. Obispo Ave., Gilbert, Ariz. 85233. In particular implementations, the LED light may include lights where the optical paths for one or more LEDs are designed to cross each other. For example, the center light may be configured to emit light directly forward while the two lights on each side are configured to emit light toward the center light, causing the light beams on each side to cross. Furthermore, where the light element 6 is an RECT-13LS mini LED warning light, controller included in each light element may be set to 250 flashes per minute on phase 1 for a first light element and 250 flashes per minute on phase 0 for a second light element. This ensures that when the controllers activate the lights on the first light element and the second light element, the two light elements flash off and on in an alternating pattern. This creates what is known as a "wig-wag" lighting effect. In various implementations, the programming of the controllers to establish the desired lighting pattern and/or effect occurs before the light elements 6 are fastened to a vehicle; in others, they may be programmable after installation by the user.

In various implementations the light element 6 of the vehicle visibility system may be configured, either alone or in conjunction with other elements, to be placed on a highway bar (bar, or crash bar) 8, as in FIG. 2. A wide variety of structures may be utilized to fasten the light element 6 to the bar. Examples of such devices and mounting systems, including bar mounts, may be found in the '470 provisional previously incorporated herein by reference. In various implementations, the light element 6 could be located on any portion of the highway/crash bar 8, or any other suitable bar-type mounting location on the vehicle. The lights of the light element 6 could be located so that they are in a vertical rather than a horizontal line, and so forth. While only a highway/crash bar 8 of a motorcycle is shown in the drawings, in various implementations the light element 6 could be coupled to any appropriate bar or structural member of a motorcycle, or any other type of vehicle, such as a roll bar of an ATV, buggy, golf cart, or some other structural bar (such as a bar or other element holding up a shade element on a golf cart or other vehicle), a bar forming a vehicle bumper, and the like. In short, any rounded element on any type of vehicle could be a place to couple the light element by virtue of a bar mount 6 or other type of bar mount.

While it is possible to couple the light element 6 to many locations on the vehicle, for vehicles such as motorcycles, it is preferred that the light element 6 be coupled to a portion of the vehicle that does not move when the vehicle is steered. The reason for this is that since the purpose of the light element 6 is to increase the vehicle's visibility, placing the light element 6 on a movable portion of the vehicle creates a situation where the light element's orientation relative to a viewer or driver is not fixed and/or adjustable. Because the light elements in preferred implementations contain LEDs combined with optics, the light emitted from such a light element is directional, meaning that there are a set of best viewing angles and positions. In such implementations, the viewed intensity of the light will vary, often significantly, depending upon the angle at which the viewer encounters the light from the light element. Since these light elements are not generally dispersed, non-omnidirectional light elements, but directional ones, the viewed intensity of the light via the viewing angle is best established and controlled when the light elements are fastened to fixed portions of the vehicle, rather than moveable portions like handlebars, or in the case of motorcycles, caliper wheel mounts. This insures that the viewing angle of the light elements to oncoming traffic and drivers remains consistent and will not be a function of the particular movement or motion the vehicle driver is making at the time. Where the viewing angle is a function of the movement or motion the vehicle driver is making, for light elements containing LEDs and optics, this will negatively impact the vehicle's overall visibility under ordinary driving conditions.

Figure 3:
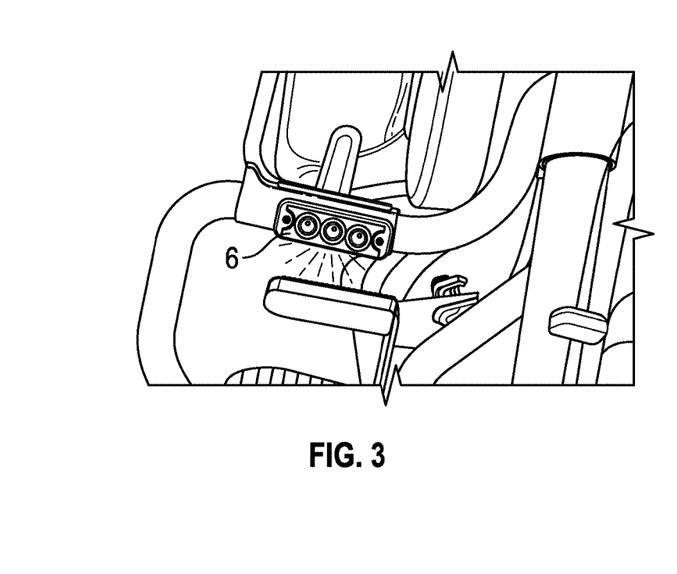
FIG. 3 is a perspective view of the light element of FIG. 2 shown when illuminated.
Figure 4:
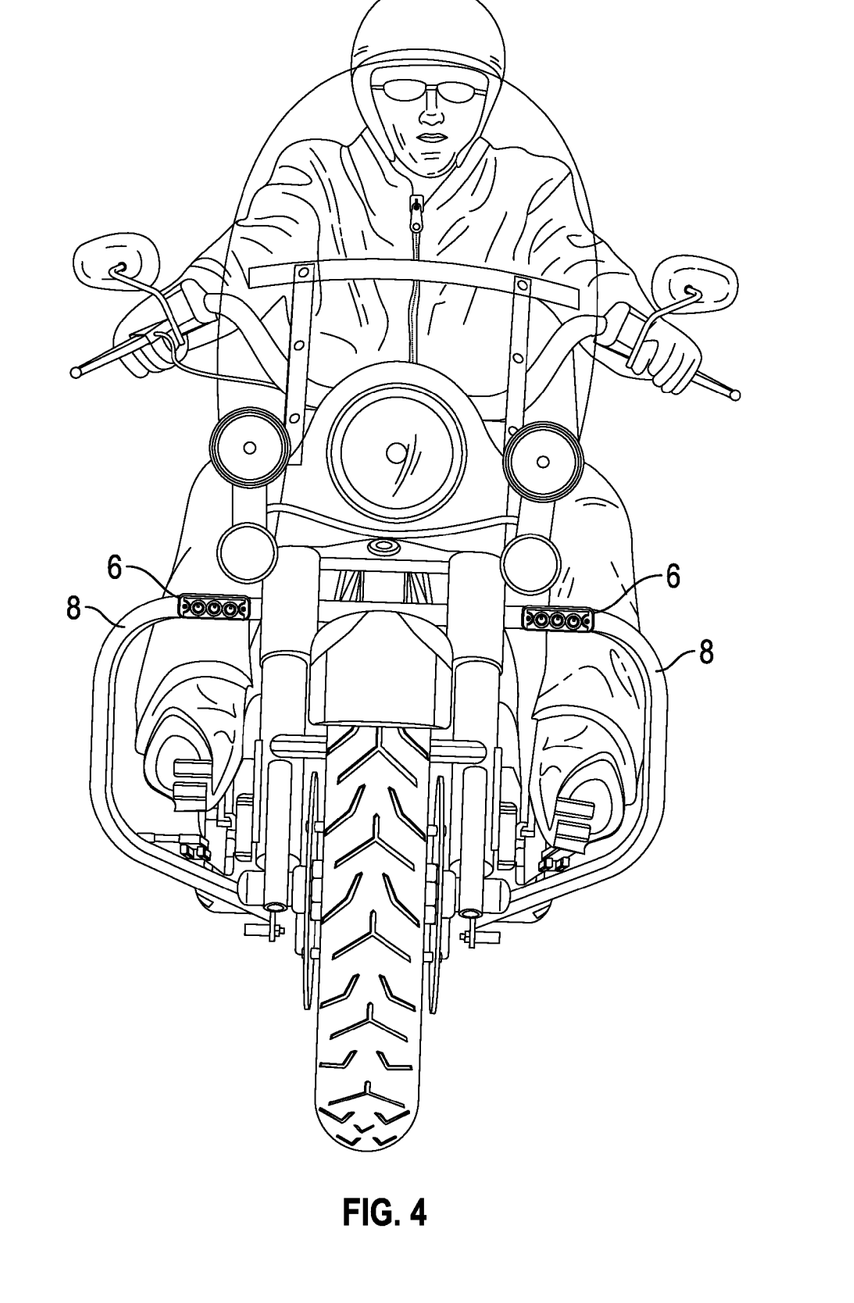
FIG. 4 is a front view of a motorcycle with two light elements installed on bars on opposing sides of the motorcycle.
Figure 5:
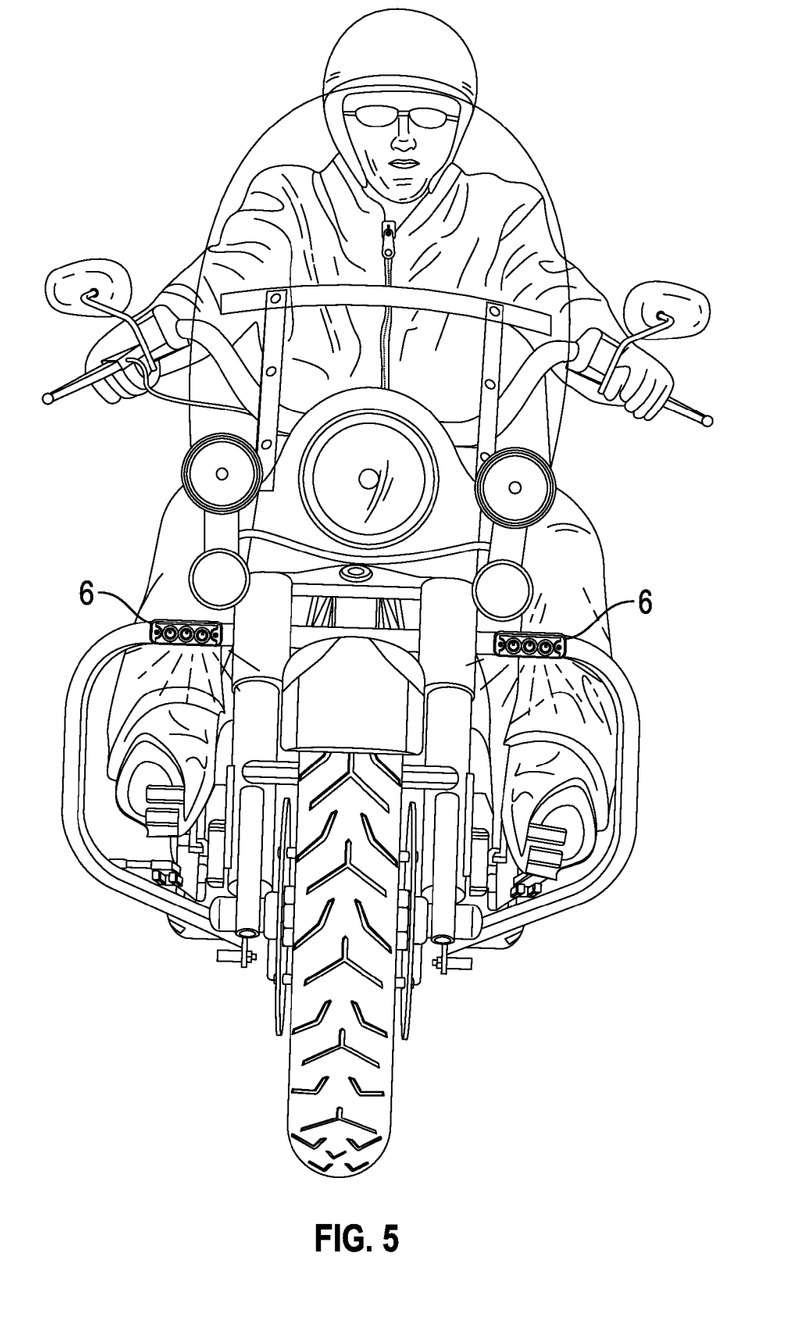
FIG. 5 is a front view of the motorcycle of FIG. 4 with the light elements illuminated.

In FIG. 2 the light element 6 is shown coupled to a highway/crash bar 8. In the figure the lights of the light element are in the "off" configuration. In FIG. 3 the same lights are shown in the "on" configuration. FIGS. 4 and 5 show a vehicle visibility system in various configurations. In FIG. 4 both light elements 6 (each coupled to a highway/crash bar 8) are in the "off" configuration. In FIG. 5 both light elements are lit. Referring to FIG. 18 of the '470 provisional, only the driver's left-side (right, looking into the paper) light element 6 is in the "on" condition. As can be observed in FIGS. 17-19, and 22 of the '470 provisional, the brightness of the light elements 6 and 10 exceeds and is brighter than the brightness of the headlamp of the motorcycle. In such implementations, the light elements 6 and 10 are likely to have greater effectiveness in attracting a motorist's attention to the motorcycle because of the greater brightness and the flashing nature of the lights on either side of the motorcycle.

In various implementations, the vehicle visibility system is configured so that, when the light elements 6 receive electrical power, they alternate between the "on" and "off" configurations so that the two light elements 6 alternately flash in a "wig wag" pattern similar to those used for emergency vehicles. In other implementations the two light elements 6 could flash in unison, or could remain on and steady, or could remain on but with varying intensity, or could change color, or the like. In preferred implementations, the wig wag pattern has been found to provide the best visibility, as the movement of the light pattern from one side of the vehicle to the other better attracts the attention of the motorist to the shape of the vehicle than always on or dual flashing configurations. In implementations a different number of light elements 6 could be used, such as one, three, four, five, six, seven, eight, and the like.

Figure 6:
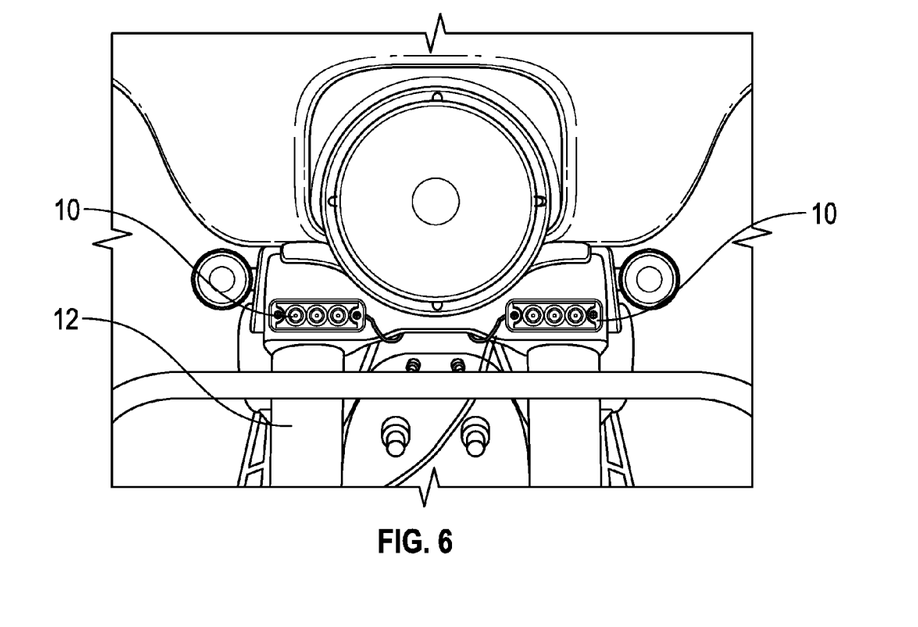
FIG. 6 is a front view of another implementation of light elements installed on each side of a motorcycle.
Figure 10:
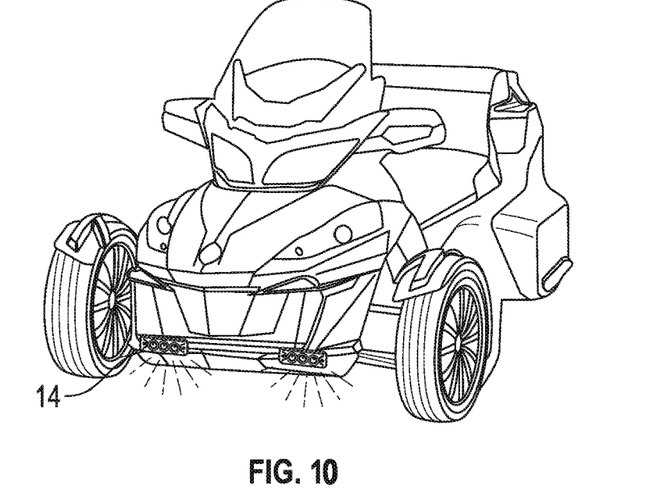
FIG. 10 is a view of another implementation of a light elements installed on a vehicle with a rightmost light element illuminated.
Figure 11:
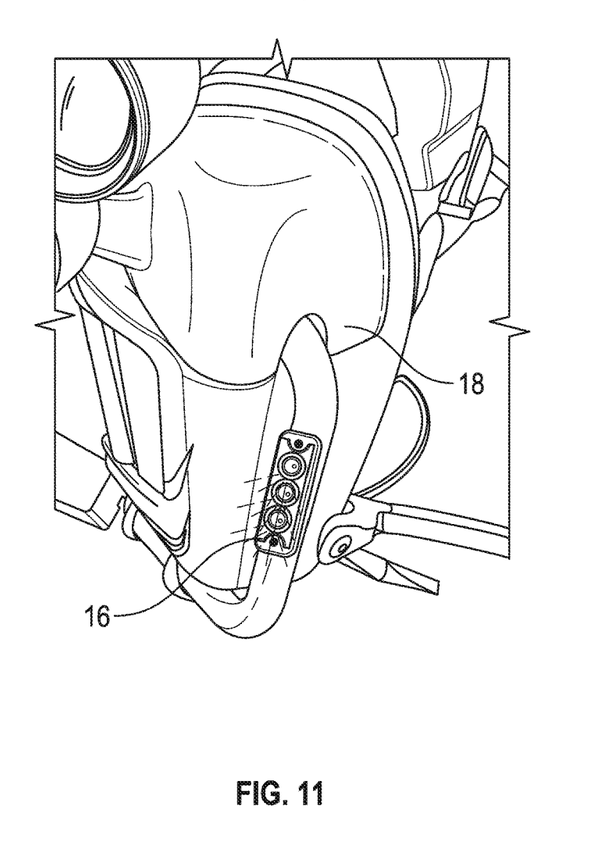
FIG. 11 is a view of another implementation of a light element installed on a bar coupled to the fairing of a motorcycle.

Referring to FIG. 6, in various implementations, the light element 10 could be coupled to a larger diameter bar or structural member than the bar mount 8, for example, the fork 12 of the vehicle with a fork mount. Relevant disclosure regarding fork and other mounts of various designs, including clamshell designs, may be found in the '470 provisional. As can be seen in FIG. 6, both elements are not lit, but may emit light according to any of the patterns disclosed herein. Referring to FIGS. 10 and 11, additional examples of the placement location for various light elements 14, 16 for different vehicle types can be seen. In FIG. 10, one light element 14 (first light element, first front facing light element) is placed on one side of a midpoint of the vehicle and another light element 14 (second light element, second front facing light element) is placed on another side of the midpoint of the vehicle (both elements are emitting light). In various implementations, the midpoint of the vehicle can also be referred to as the centerline of the vehicle about which the vehicle structure is substantially symmetric when viewed from the front of the vehicle. FIG. 11 shows a light element 16 coupled to a bar associated with the fairing 18 of the vehicle. In other implementations, the light element 16 may be coupled directly to the fairing 18 and shims and other leveling and directing elements as disclosed in the '470 provisional may be utilized to ensure a desired angle of view and position for the light element 16.

Figure 7:
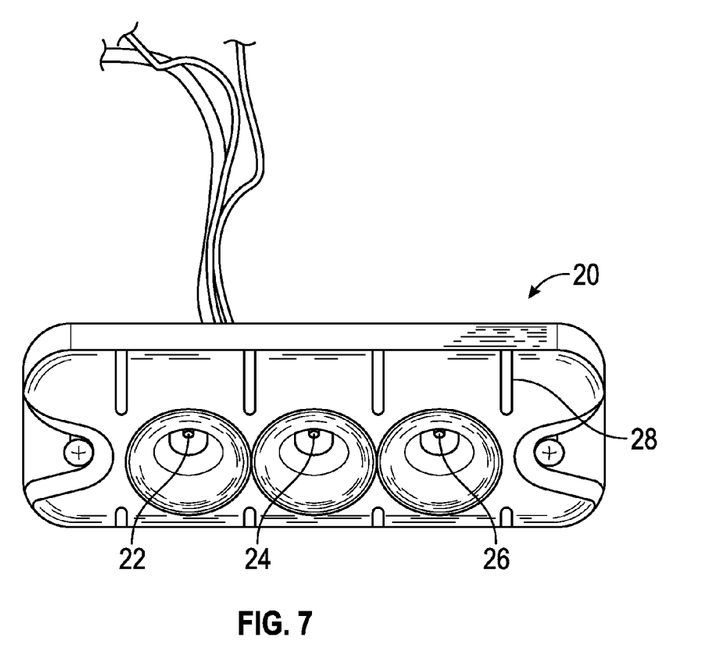
FIG. 7 is a perspective view of a light element implementation.

Referring to FIG. 7, an implementation of a light element 20 is illustrated. As previously discussed, the light element 20 includes three LEDs, 22, 24, 26 covered by a lens 28. A controller is included in the light element 20 as an integral part of the electronics controlling the LEDs 22, 24, and 26. In other implementations, the controller may be a separate component from the circuit components controlling the LEDs 22, 24, 26 contained in the same enclosure forming the light element 20.

Figure 8:
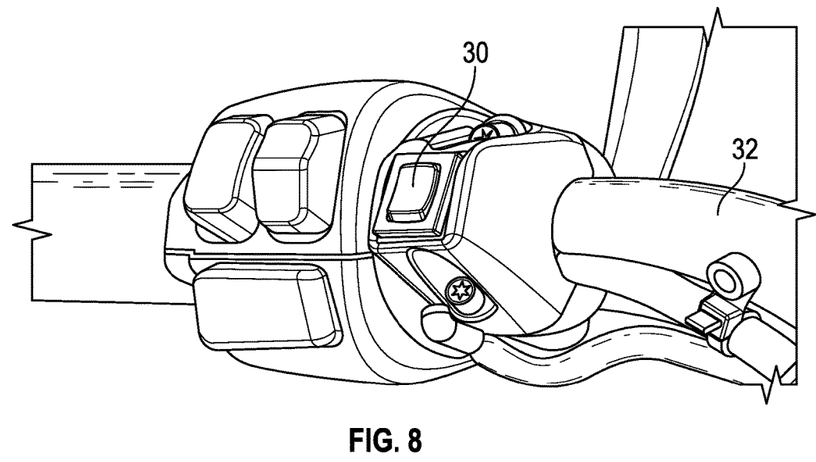
FIG. 8 is a perspective view of an implementation of a switch fastened to a motorcycle handlebar.
Figure 9:
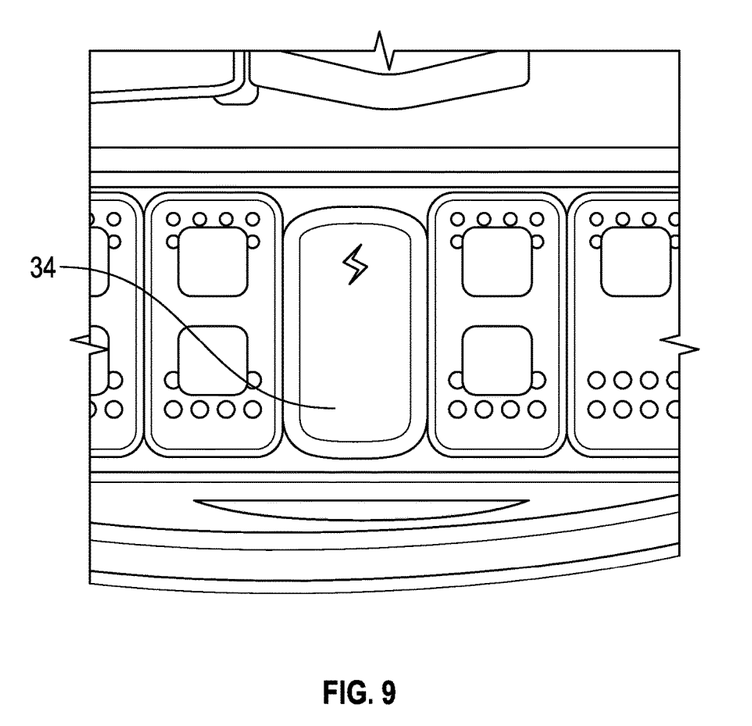
FIG. 9 is a top view of another implementation of a switch in a motorcycle switch panel.

Many different switch types are disclosed and discussed at length in the '470 provisional, any of which could be employed in any of the implementations of vehicle visibility systems disclosed herein along with any of the switch mounting structures disclosed. Referring to FIG. 8, an example of a manual switch (switch) 30 is illustrated coupled to the handlebar 32 of a motorcycle. As illustrated, the manual switch 30 may be coupled next to other switches that control other components of the motorcycle. During operation, the manual switch 30 is activated by the rider, which provides electricity from an electrical power source in the vehicle (battery, alternator, etc.) to the light elements electrically coupled with the manual switch 30, and activates the controller in the light elements, causing them to illuminate according to the predetermined pattern. Referring to FIG. 9, in other implementations, the switch 34 may be incorporated directly into a switch panel (switch bank) included in the vehicle. In such implementations, the switch 34 may be a manual switch as well. As discussed in the '470 provisional, the switch may also be a rewired accessory switch device already present in a switch cluster or housing on the vehicle.

Figure 12:
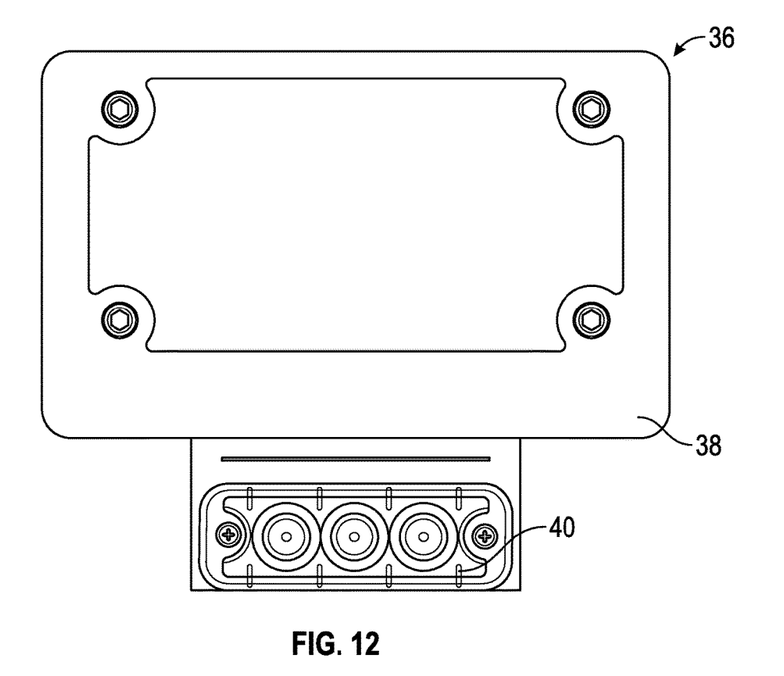
FIG. 12 is a front view of a rear visibility system showing a light element coupled to a license plate cover.
Figure 13:
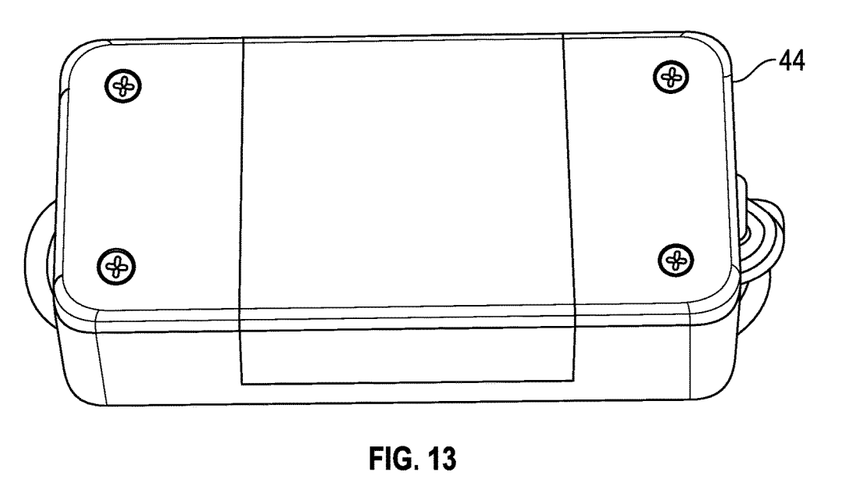
FIG. 13 is a back view of a controller for an implementation of a rear visibility system.

Referring to FIG. 12, an implementation of a motorcycle rear visibility lighting system 36 is illustrated. As illustrated, the system 36 includes a license plate cover 38 and a light element (rear light element) 40. Both the license plate cover 38 and light element 40 are coupled to bracket 42, shown in FIG. 14. Light element 40 may be any disclosed in this document. In various implementations, any of the shims disclosed in the '470 provisional and any other additional mounting braces or brackets may be used to fasten bracket 42 to the motorcycle. Light element 40 is also coupled to controller 44 which is illustrated in FIG. 13 which is, in turn, also electrically coupled to the power source of the motorcycle and to the brake sensor wire of the motorcycle that goes to the existing rear brake light of the motorcycle. During operation, the controller 44 receives a copy of the signal being sent from the brake sensor wire and allows power to flow to the light element 40. In some implementations, the light element 40 remains on as long as the controller 44 applies power to the light element 40; in others, a controller associated with the light element 40 (like any of those disclosed in this document) is programmed to cause the light element 40 to illuminate for a predetermined period. In either implementation, the light element 40 remains lighted at a very high intensity for a short period of time (flash). In particular implementations, the predetermined period during which the light element 40 is lighted is less than 2 seconds, at which time the light element 40 turns off. If the brake sensor wire again senses that the rider has applied the brakes again, the controller 44 will again reapply power to the light element 40. Since the intensity of the light element 40 may, over too long a period of time, appear too intense to a driver following the motorcycle, the use of a very brief flash may effectively warn the driver that the motorcycle is braking without adversely affecting the driver's ability to see.

Figure 14:
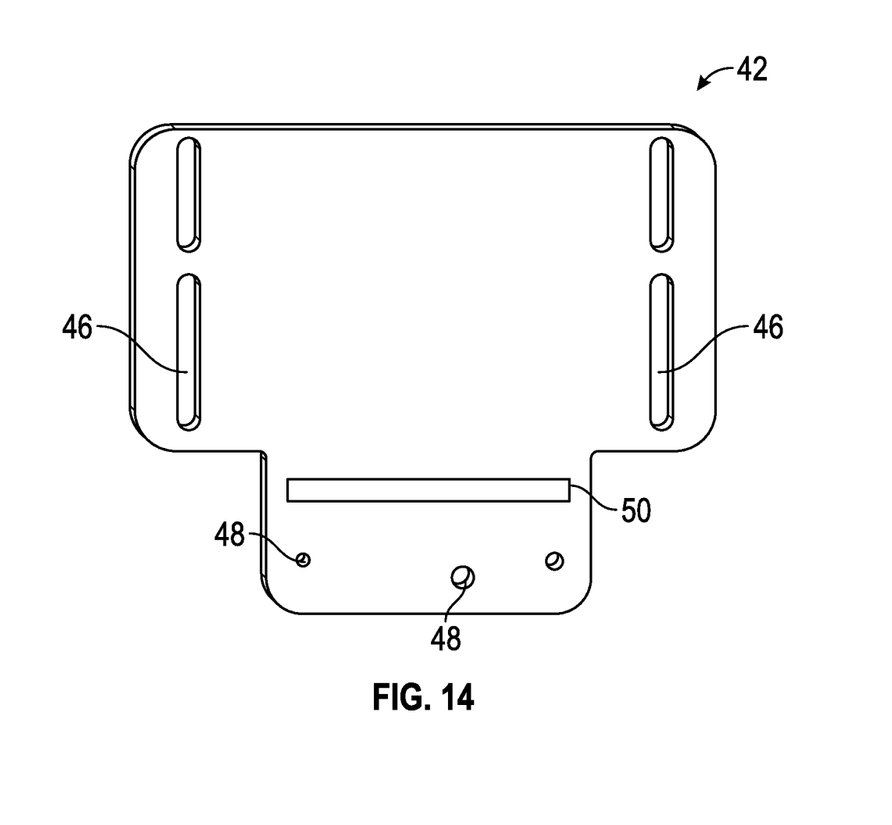
FIG. 14 is a view of a bracket for an implementation of a rear visibility system.

Referring to FIG. 14, the bracket 42 includes one or more plate mounting openings 46 therein and one or more light element openings 48 therein. In addition, the bracket 42 contains an angle adjustment opening 50 therein. The angle adjustment opening 50 is very narrow with respect to its width and extends across a majority of the distance of the lower portion of the bracket 42. In doing so, the angle adjustment opening 50 just leaves two relatively small portions of the bracket 42 uncut through, permitting bending of the bracket 42 along a line formed by the angle adjustment opening 50. During installation of the bracket 42, because the license plate may need to sit at an angle different than that desired to establish a proper viewing angle of the light element 40, being able to bend the portion of the bracket 42 to which the light element 40 is attached allows the installer to adjust the angle of the light element 40 to the desired viewing angle. Being able to adjust to the desired viewing angle permits the light element 40 to flash in the best position to be observed by a motorist following the motorcycle. In some implementations, no angle adjustment opening may be used.

Figure 15:
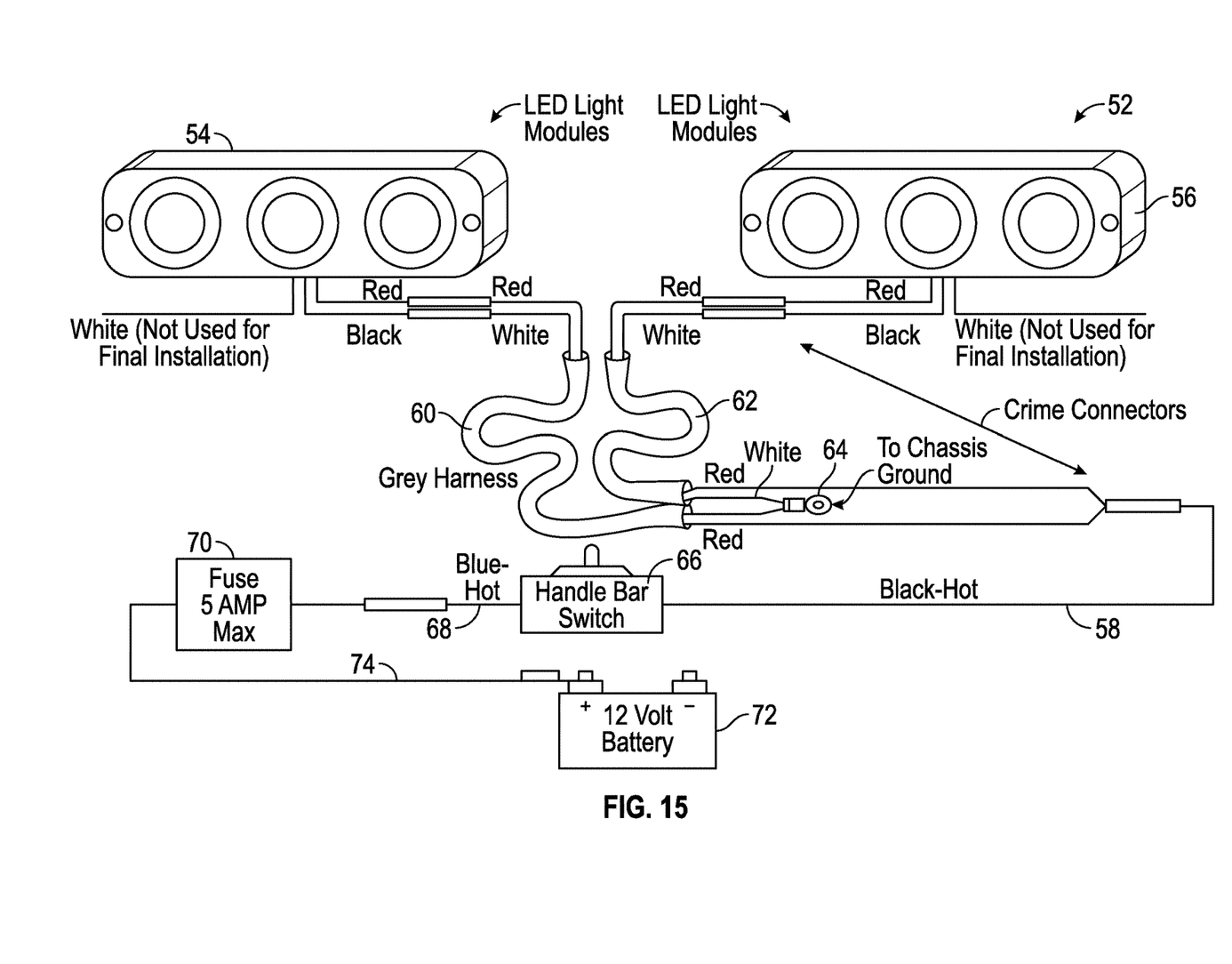
FIG. 15 is a diagram of the components and wiring of an implementation of a vehicle visibility system.

Referring to FIG. 15, a wiring diagram for an implementation of a vehicle visibility system 52 is illustrated. In the diagram, the first front facing light element 54 and second front facing light element 56 are coupled together to chassis ground 64 and to a first switch wire 58 through a first wire 60 and a second wire 62. A switch 66 is coupled to the first switch wire 58 and to a second switch wire 68 to a fuse 70 which serves to isolate the switch and light elements 54 and 56 from the power source 72. A power wire 74 couples the fuse 70 with the power source 72. As illustrated, under control of the switch 66, power from the power source 72, travels to the light elements 54 and 56 in response to the switch 66 closing.

Implementations of vehicle visibility systems may include a kit of components that make up the system. In a first implementation, the kit includes a first front facing light element that includes a controller and a second front facing light element that includes a controller. The kit also includes a switch, a first mount and/or first shim, and a second mount and/or second shim. In other implementations, the kit may also include a first wire, a second wire, a first switch wire, and a second switch wire. The kit may also include a fuse and a power wire. In particular implementations of a kit, the kit may include all of the foregoing components and license plate bracket like that disclosed herein, a rear light element, and a rear light element controller. In various implementations, the kit may also include a rear power wire and a rear brake signal wire.

In places where the description above refers to particular implementations of vehicle visibility systems, kits, and implementing components, sub-components, methods and sub-methods, it should be readily apparent that a number of modifications may be made without departing from the spirit thereof and that these implementations, implementing components, sub-components, methods and sub-methods may be applied to other vehicle visibility systems and kits.

What is claimed is:
1. A vehicle visibility system comprising:
at least a first light element coupled to one of a first bar and first fairing of a vehicle and located on a first side of the vehicle and at least a second light element coupled to one of a second bar and second fairing of a vehicle and located on a second side of the vehicle where the first side is on one side of a midpoint of a front of the vehicle and the second side is located on another side of the midpoint of a front of the vehicle;
a manually activated switch coupled to one of a handlebar and switch panel of the vehicle, the manually activated switch operatively coupled to the at least first light element and to the at least second light element, where the manually activated switch is operatively coupled to an electrical power source comprised in the vehicle;

wherein the at least first light element and the at least second light element each comprise a controller;

wherein the at least first light element and the at least second light element are oriented to face the front of the vehicle;

wherein the controller of the at least first light element and the controller of the at least second light element are configured to flash at one of alternate times and alternate patterns of flashes in response to receiving electrical power from the electrical power source when the manually activated switch is in the on position, thereby increasing the visibility of the vehicle to oncoming traffic viewing the front of the vehicle.

2. The system of claim 1, further comprising a motorcycle rear visibility lighting system comprising:

a bracket configured to couple with a motorcycle license plate, the bracket containing one or more plate mounting openings therein, one or more light element openings, and an angle adjustment opening therein configured to permit the adjustment of the angle of a light element coupled to the bracket.

3. The system of claim 2, further comprising a light element coupled to the bracket, wherein the light element is coupled to a controller and is configured, in response to receiving a brake signal from the vehicle, to flash at high intensity for a predetermined period of time.

4. The system of claim 3, wherein the predetermined period of time is less than 2 seconds.

5. The system of claim 1 wherein the at least first light element and the at least second light element comprise one or more light emitting diodes (LEDs) and the LEDs are brighter than a brightness of a headlamp of the vehicle.

6. A vehicle visibility system comprising:

a first front facing light element configured to couple to a vehicle on a first side of a center line of a vehicle;

a second front facing light element configured to couple to a vehicle on a second side of the center line of the vehicle;

a switch configured to electrically couple with the first front facing light element and with the second front facing light element and with an electrical power system of the vehicle;

wherein the first front facing light element and the second front facing light element each comprise a controller, and each are configured to alternately flash using the controller in response to receiving an electrical signal from the switch when the switch is in an activated position;

wherein when the first front facing light element and the second front facing light element are alternately flashing, the visibility of the vehicle to oncoming traffic is increased;

wherein the first front facing light element and the second front facing light element are configured to couple only to a portion of the vehicle that is fixed when the vehicle is steered.

7. The system of claim 6, wherein the at first front facing light element and the second front facing light element comprise one or more light emitting diodes (LEDs) and the LEDs are brighter than a brightness of a headlamp of the vehicle.

8. The system of claim 6, further comprising a vehicle rear visibility lighting system comprising:

a bracket configured to couple with a motorcycle license plate, the bracket containing one or more plate mounting openings therein, one or more light element openings, and an angle adjustment opening therein configured to permit the adjustment of the angle of a light element coupled to the bracket.

9. The system of claim 8, further comprising a light element coupled to the bracket, wherein the light element is coupled to a controller and is configured to, in response to receiving a brake signal from the motorcycle, flash at high intensity for a predetermined period of time.

10. The system of claim 9, wherein the predetermined period of time is less than 2 seconds.

* * * * *